Feb. 20, 1923.
B. E. WILLETT.
DISPLAY DEVICE.
FILED APR. 28, 1921.
1,446,233.
5 SHEETS—SHEET 4.
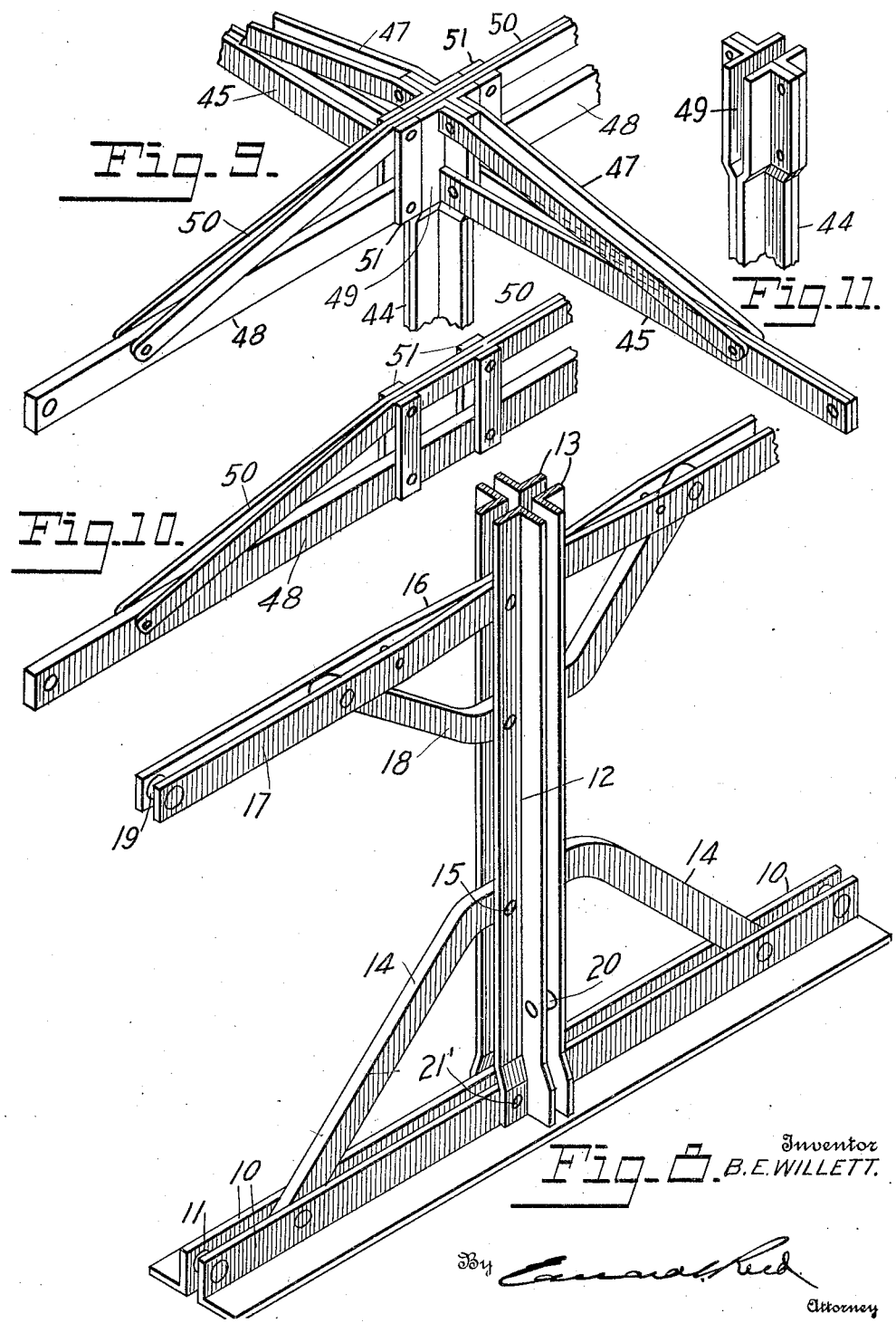

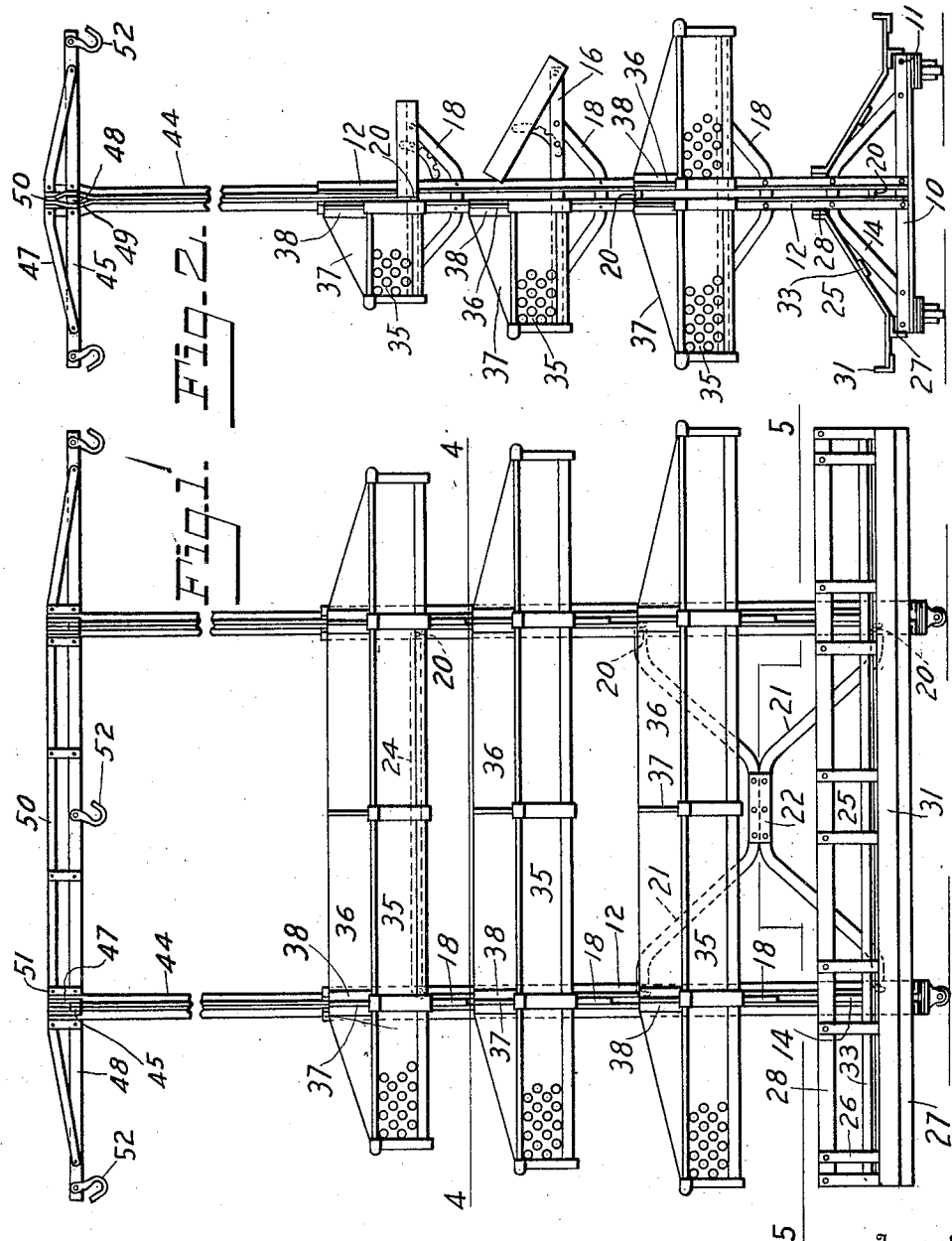

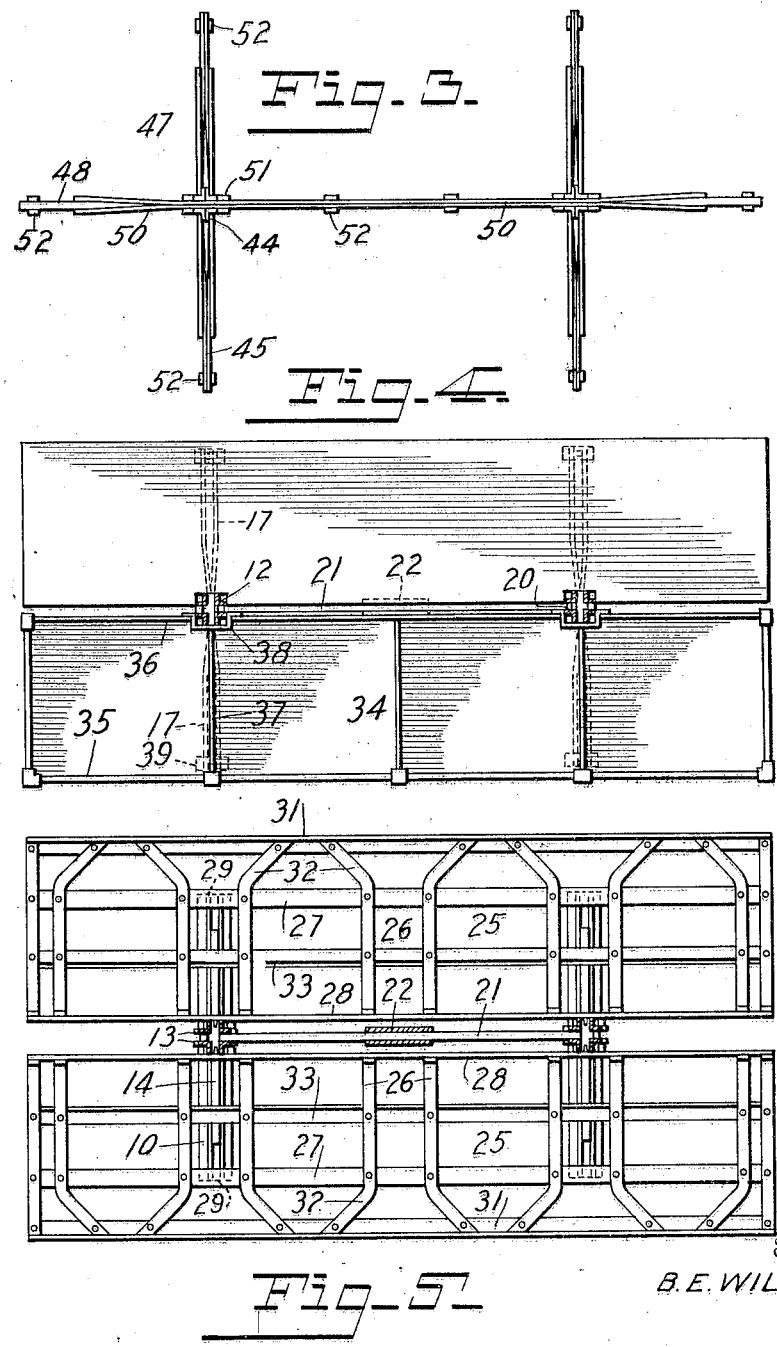

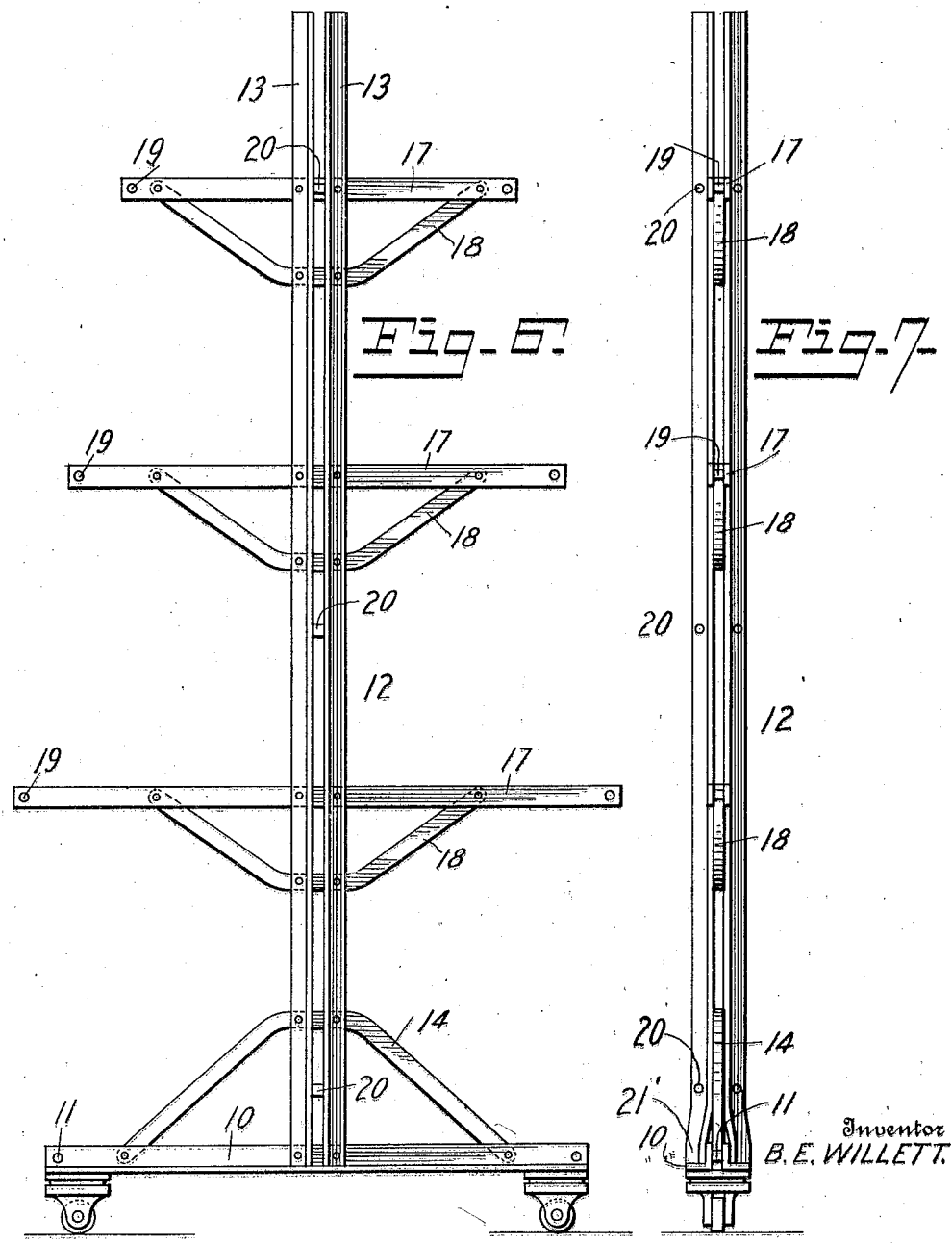

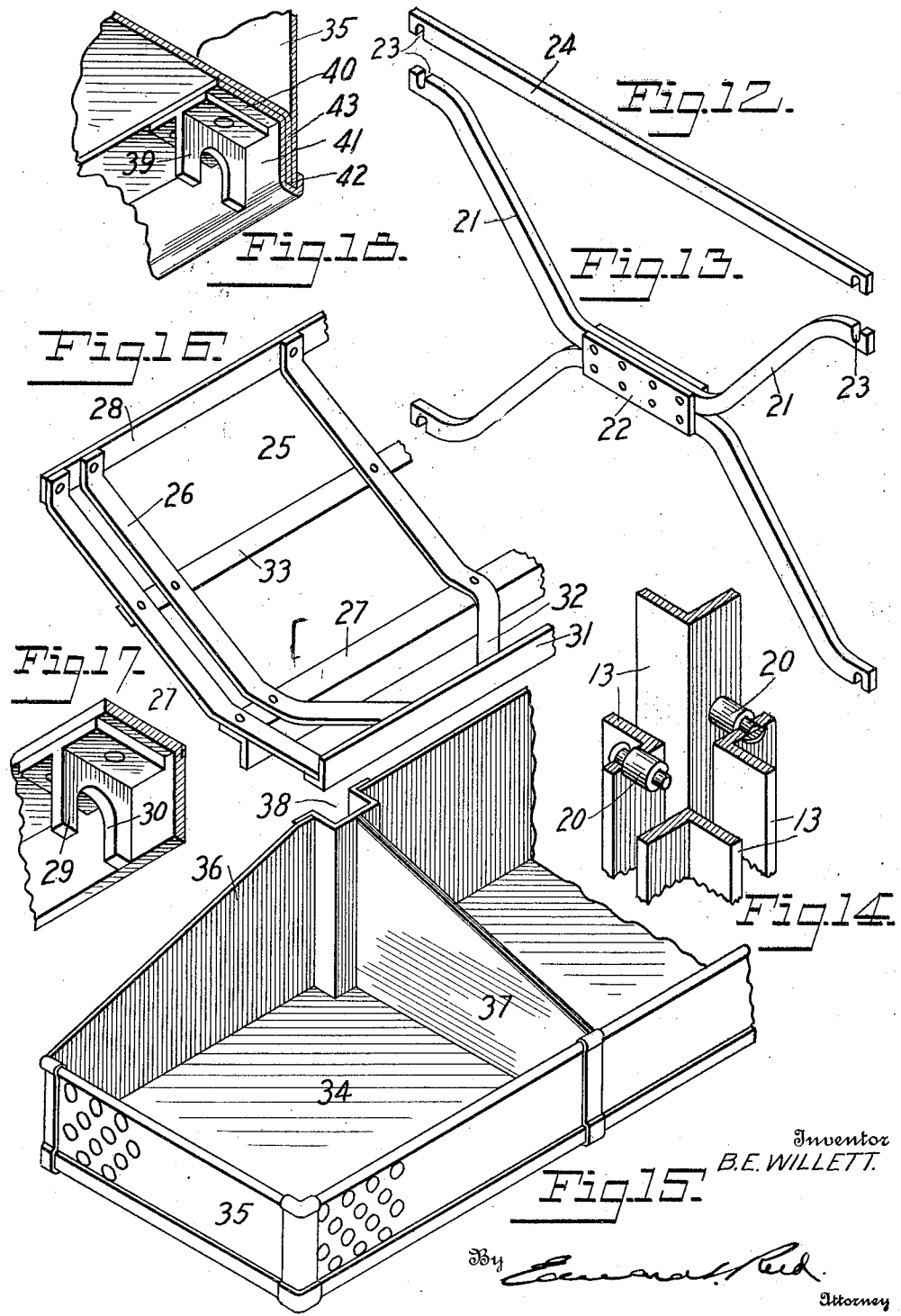

Patented Feb. 20, 1923.

1,446,233

UNITED STATES PATENT OFFICE.

BENEDICT E. WILLETT, OF DAYTON, OHIO.

DISPLAY DEVICE.

Application filed April 23, 1921. Serial No. 465,197.

*To all whom it may concern:*

Be it known that I, BENEDICT E. WILLETT, a citizen of the United States, residing at Dayton, in the county of Montgomery and State of Ohio, have invented certain new and useful Improvements in Display Devices, of which the following is a specification, reference being had therein to the accompanying drawing.

This invention relates to display devices and more particularly to a device comprising a plurality of superimposed racks upon which articles of merchandise may be conveniently and attractively displayed.

One object of the invention is to provide a display device of this kind of such a construction that it can be readily taken apart and packed in a compact bundle for shipment or storage.

A further object of the invention is to provide such a device which will be so constructed that the several parts thereof can be quickly and easily put together, without the use of tools, by a person unskilled in mechanics.

A further object of the invention is to provide such a device which will be simple in its construction and of a very strong, durable character.

Other objects of the invention will appear as the device is described in detail.

In the accompanying drawings Fig. 1 is a front elevation of a device embodying my invention, completely assembled; Fig. 2 is an end elevation of such a device; Fig. 3 is a top plan view of the same with the racks removed; Fig. 4 is a sectional view taken on the line 4—4 of Fig. 1; Fig. 5 is a section taken on the line 5—5 of Fig. 1; Fig. 6 is a side elevation of one of the upright structures or units; Fig. 7 is an edge view or front elevation of one of the upright structures; Fig. 8 is a perspective view of the lower portion of one of the upright structures showing the base and one of the supporting members; Fig. 9 is a perspective view, partly broken away, of the banana supporting rack; Fig. 10 is a perspective view of one end portion of the longitudinal connecting member forming part of the banana rack; Fig. 11 is a perspective view of the upper end of the supplemental standard which receives the banana rack; Fig. 12 is a perspective view of the upper longitudinal connecting member; Fig. 13 is a perspective view of the lower longitudinal connecting member; Fig. 14 is a perspective view of the standard forming part of the upright structure, broken away to show the details of construction; Fig. 15 is a perspective view of one end of one of the bins; Fig. 16 is a perspective view of one end of the basket rack; Fig. 17 is a detail view of the connecting member carried by the basket rack and securing the same to the supporting structure; and Fig. 18 is a sectional detail view of a portion of one of the bins showing the attaching member for connecting the same with the supporting member.

In these drawings I have illustrated one embodiment of my invention and have shown the same as comprising a plurality of upright structures, each constituting a separate unit and comprising laterally extending rack supporting members. Each upright structure is complete in itself and the several parts thereof are permanently secured one to the other and the character and arrangement of the parts are such that the structure is relatively flat and when laid upon the floor will have an over all height of only a few inches, usually not more than three inches. Each display device will comprise two or more of these upright structures which are rigidly connected one to the other by detachable connecting members which extending lengthwise of the display device and are detachably connected at their ends with the respective upright structures, these connecting members also being of a flat construction. The articles to be displayed are supported by racks of various kinds adapted to the particular character of the article to be displayed. These racks may be of such a character as to receive baskets or boxes or the articles may be placed directly upon the racks. In either instance the racks are so constructed that they will be supported by the supporting members of the vertical structures and they are of a relatively shallow construction so that they may be piled one upon the other in a comparatively small and compact bundle. If desired, an overhead supporting structure, especially designed for supporting bunches of bananas, may be mounted on the upper ends of the upright structures and this overhead supporting structure comprises cross arms carried by supplemental standards adapted to be mounted on the upper ends of the respective upright structures. The supplemental standards are connected one to the other by a longitudinally extending frame member, or truss bar, which not only serves to brace the standards one against the other, but extends beyond the standards and forms suspending arms. The longitudinal connecting member, or truss bar, is readily removable from the supplemental standards and is of a flat construction. The cross arms are permanently secured to the supplemental standards but are of a flat construction so that they will occupy a comparatively small amount of space when laid flat upon the other parts of the device. It will be apparent, therefore, that the display device, as here shown, comprises a series of units, each complete in itself, adapted to be readily connected with or disconnected from one another and that these units are of such a character that they may be piled flat one upon the other in a comparatively small space, thereby enabling the device as a whole to be crated in a small, compact bundle, which greatly facilitates shipping and storage. It will be understood that the several units may take various forms and may be connected one to the other in various ways without departing from the spirit of the invention, the present construction being shown for the purpose of illustration only.

In that form of the device here illustrated each of the upright structures, or units, comprises a narrow base extending transversely to the length of the display device as a whole and preferably mounted on castors. As here shown this base is formed of two angle irons 10 having their vertical flanges extending upwardly adjacent one to the other and rigidly connected one to the other but spaced apart. Preferably the two angle bars are connected together by spacing rivets 11 which form a rigid connection between the two bars but space the same apart to form a slot between them. Extending upwardly from the base and rigidly secured thereto is a standard 12 which, in the present instance, is connected with the base midway between its ends. This standard is provided with slots extending longitudinally of the device as a whole and transversely thereof and it is, in the present instance, formed of four angle bars 13, having their angles arranged adjacent to the center of the standard and having their adjacent faces parallel but spaced apart to form slots. The width of the slots may vary according to the size of the bars employed or according to other conditions, but in the present construction the slots are approximately a quarter of an inch wide. A suitable brace is interposed between the standard 12 and the base, and, as here shown, this brace comprises a bar 14 extending through the transverse slot in the standard 12 and rigidly secured to the standard by means of rivets 15, or other suitable fastening devices. The ends of this brace are bent downwardly so as to give the brace an arch shape, and extend into the slot between the two members 10 of the base to which they are rigidly secured by means of rivets, or other fastening devices. This bar being of a thickness substantially equal to the width of the slot serves also to space the two bars of the brace apart and to stiffen this construction.

Rigidly secured to the standard 12 at suitable distances above the base are a plurality of rack supporting members 16 which project laterally from the standard 12 substantially parallel with the base. Each supporting member preferably extends through the transverse slot of the standard 12 and projects on both sides of that standard. In the present construction each supporting member comprises two bars 17, the central portions of which are in contact one with the other and are of a combined thickness substantially equal to the width of the transverse slot, in which they are rigidly secured by means of rivets, or the like. Those portions of the bars 17 which project beyond the sides of the standard are spaced apart to receive between them the upper ends of an arch shaped brace 18, the central portion of which extends through the transverse slot of the standard at a point below the supporting member. The brace is riveted, or otherwise rigidly secured both to the standard and to the end portions of the supporting member. The extreme outer end portions of the two bars 17 are rigidly secured one to the other and maintained in their spaced relation by spacing rivets 19. The braces and supporting members extend through the transverse slot of the standard and serve to space apart the angle bars lying on the opposite sides thereof to form the transverse slot and inasmuch as all the angle bars are rigidly secured to the braces and supporting members these members serve to space the angle bars apart to form the longitudinal slot, but I have also shown the two angle irons lying on each side of the connecting member as connected together and spaced apart by spacing rivets 20. The lower ends of the angle bars may be secured to the base members in any suitable manner but I prefer to bend the lower ends of these angle bars outwardly so as to enlarge the transverse slot at its lower end sufficiently to enable it to receive the two vertical flanges of the base, as shown at 21, and to which the lower ends of the angle bars 13 may be rigidly secured, as by means of rivets. It will be apparent that the upright structure thus constructed is of an over all width not greater than the thickness of the base, and that the several parts thereof are rigidly and permanently connected one to the other. I have, in the present instance, shown these upright structures, as designed to receive display racks on both sides thereof, but where it is desired to employ the racks on one side of the structure only, as when it is set against a wall, it will be obvious that the supporting arms and base on one side of the standard 12 may be omitted without other changes in construction.

As has been stated, each display device comprises two or more of the upright structures, depending upon the length of the device but in the present instance I have shown only two upright structures. These structures are connected one to the other and rigidly maintained in properly spaced relation by means of connecting members extending lengthwise of the device and having their ends securely attached to the standards of the respective upright structures. In the particular construction here shown the main connecting device comprises two arch shaped bars 21 having parallel central portions arranged edge to edge and rigidly connected one to the other by means of tie plates 22. The end of each arch shaped bar is turned at substantially right angles to the standard of the supporting structure and is adapted to enter the longitudinal slot in that standard. Preferably, the bars and the standards have interlocking parts which can be readily placed in operative relation one to the other or removed from that relation, and, as here shown the ends of the upper and lower bars have, respectively, upwardly and downwardly opening slots 23, thus giving to the end of each bar a hook shape which is adapted to engage over the spacing rivets 20, which are arranged at proper heights for this purpose. The bars have sufficient resilience to permit the hook shaped ends thereof to be sprung into engagement with the spacing rivets and to hold the same firmly in engagement therewith. When the connecting member has been placed in position and the hook shaped ends thereof brought into engagement with the several spacing rivets, or connecting studs, it can be removed therefrom only by applying positive force thereto in an upward direction and, consequently, there is little likelihood of its being accidentally displaced with the display device is in use. However, when it is desired to disassemble the display device this connecting member can be very quickly and easily removed by lifting the same upwardly. Where the upright structures are of considerable height it may be desirable to interpose another connecting member, or members, between the same, and in the present construction I have shown an upper connecting member 24 comprising a bar having hook-shaped ends, similar to the ends of the bars 21, adapted to engage other connecting studs, or spacing rivets, in the longitudinal slots of the standards. It will be noted that the ends of the connecting devices extend into one side only of the longitudinal slot and that the spacing rivets, or connecting lugs, are arranged on both sides of that slot so that if it is desired to add another vertical structure to the display device a second connecting device may be secured to either of the upright structures shown in the present drawings by inserting the ends of the same in the other side of the longitudinal slot and causing these ends to engage the spacing rivets in said slots. It will be apparent from the drawings and description that these connecting members are of a flat construction and that when separated from the upright structures that they may be packed in a very small space.

As has been stated the display racks are carried by the supporting members 16 and in this connection it will be noted that the base also constitutes a supporting member and is adapted to have display racks mounted thereon. The character of the display racks may be varied to accommodate the same to the character of the goods to be displayed or to the desires of a particular merchant, but in the preferred arrangement I mount upon the base a display rack adapted to receive and support boxes, or baskets, which is indicated as a whole by the reference numeral 25. Each rack is in the form of a skeleton frame comprising a plurality of transverse bars 26 connected one to the other and maintained in properly spaced relation by means of longitudinal bars 27 and 28. The bar 27 is preferably in the form of an angle iron which engages over and rests upon the ends of the bases. The lower portions of the transverse members 26 are perferably substantially horizontal and the bar 27 is connected therewith some distance to the rear of their outer ends. The rear, or inner, portions of the bars 26 are bent upwardly so that they set at an inclination to the outer or horizontal portions of the bars, and the longitudinal bar 28 is connected with the upper ends of these inclined portions and so arranged that when the angle bar 27 rests upon the bases the bar 28 will rest against the standards, and in the present arrangement this bar also engages the upper edge of the brace 14. This frame, or rack, is detachably secured to the supporting members, or bases, so that it can be easily placed in position thereon or rmoved therefrom and preferably the rack and the bases are provided with interlocking parts so that the connection may be established by merely placing the rack in position. As here shown, the longitudinal bar 27 has secured thereto depending lugs 29 which have slots or notches 30 opening through the lower edges thereof and so arranged that when the bar 27 is placed in position on the bases the notched lugs 29 will engage the respective spacing rivets, or connecting studs at the ends of the bases. The weight of the rack will hold these lugs firmly in engagement with the rivets and there will be little liability of the connection being disturbed, particularly when the rack is filled with baskets or boxes of vegetables or fruit. The transverse bars 26 are connected at their outer ends by a third longitudinal bar 31 which is also in the form of an angle bar and has one flange extending upwardly above the upper surfaces of the bars 26 to form a ledge, or shoulder, against which the edges of the boxes or baskets may engage and which will hold them against slipping off the rack. If desired, the lower ends of adjacent bars 26 may be bent toward one another, as shown at 32 to form a loop which is particularly adapted to receive a round basket, such as the ordinary bushel basket. I have, in the present instance, shown another longitudinal bar 33 connected with the transverse bars between the bars 27 and 28, which serves both to partially close the space between these bars and to further reinforce the rack. The racks which are supported upon the upper supporting members may, as has been stated, take various forms but a part of these racks, at least, are preferably in the form of bins to receive loose articles, such as fruits or vegetables. These bins may take various forms but as here shown they are formed of sheet metal, are relatively shallow, and of a length corresponding to the length of the display device. They are removably attached to the supporting members so that they will be firmly held in position while in use but may be readily removed or placed in position. As here shown in Figs. 15 and 18, each bin comprises a bottom plate 34 and edge walls 35, rigidly connected at their lower edges with the bottom plate. The rear wall 36 is preferably of a height somewhat greater than the height of the front and end walls 35 as this gives the bin much greater capacity without detracting from the accessibility thereof. It is also preferable that the bins be divided into compartments by transverse partitions 37. In order that the bins may be as wide as is possible and to avoid waste space in the display device, I prefer to form the rear wall 36 of each bin with a vertical recess, or notch, 38 which will embrace the standards of the respective supporting structures and will thus permit the back walls of the bins on the opposite sides of the standards to lie close one to the other. Further, these notches serve to resist any tendency of the bins to move lengthwise and thus prevent the twisting or distortion of the bin. The bin is connected with the supporting members, preferably by interlocking devices, and, as here shown, the bottom of the bin has depending therefrom a notched lug 39 adapted to enter the space between the two bars of the supporting member and to engage the spacing rivet thereon. As here shown, this lug is carried by a bottom strip 40 extending along the edge of the bin beneath the bottom plate 34. This strip has a downwardly turned flange portion 41, the lower edge of which is turned outwardly and upwardly to form a channel 42, into which extends a flange 43, extending downwardly from the edge of the bottom plate 34, and the lower edge of the wall 35, the edges of the flange and the wall being firmly gripped between the walls of the channel. It will be noted that the downwardly extending portions or flanges of the bin conceal the ends of the supporting members and the interlocking devices so as to give the device a finished and pleasing appearance. The transverse supporting members 16 may all be provided with bins, such as have been described, or they may be provided with racks or trays of any suitable character and in Fig. 2 of the drawings I have shown a part of the supporting members as provided with a bin on one side of the standards and with shelves on the other side.

The structure so far described constitutes a complete display device in itself but it may, if desired, have added thereto an overhead supporting device which, in the present instance, is designed primarily to support bunches of bananas, which are suspended therefrom. To this end I have provided an overhead supporting rack which consists of supplemental standards 44 adapted to be detachably connected with the upper ends of the standards 12 of the upright structures. As here shown, each supplemental standard is formed of four angle irons, but instead of having their adjacent surfaces spaced apart, as in the case of the standard 12, they are rigidly secured together with their adjacent faces in contact one with the other. Consequently, the supplemental standards may extend into the spaces between the angle bars of the main standards 12 and when in position therein will be held firmly against displacement. The downward movement of the supplemental standard may be limited in any suitable manner but in the present instance it rests upon the upper rack supporting member where the latter extends through the standard. Rigidly secured to the lateral edges of the supplemental standard at its upper end are supporting arms which, as here shown, comprise bars 45 extending laterally from the standard and rigidly secured thereto at their inner ends, preferably by forming each bar in two parts and spreading the parts at the inner end of the bar to enable them to embrace the adjacent flanges of the supplemental standard to which they are rigidly secured. Each arm is braced by a pair of arms 47 secured at their outer ends to the bar 45 on opposite sides thereof, and at their inner ends to the adjacent flanges of the supplemental standard at a point above the bar 45. The two supplemental standards are connected together and braced one against the other by a longitudinal member which is detachably secured thereto and which constitutes both a brace bar and a supporting member. As shown more particularly in Figs. 9 and 10, this longitudinal member comprises a bar 48 of a length greater than the distance between the two supplemental standards so that its ends will project beyond both of these standards. This bar is adapted to fit within a recess, or slot, 49 formed in the upper end of each supplemental standard by bending the upper ends of the angle bars outwardly, as shown in Fig. 11. A truss member is connected with the bar 48 to reinforce the same and as here shown this member comprises two parallel bars 50 of a combined thickness substantially equal to the thickness of the main bar 48. These bars 50 lie face to face for the greater portion of their length and are rigidly connected with the bar 48 by the bars, or cleats, 51, those tie bars adjacent to the supplemental standards 44 being so arranged as to form guides to engage the longitudinal edges of these standards and properly position the supporting bar with relation thereto. Those portions of the truss bars 50 which project beyond the supplemental standards are spread apart and caused to embrace the end portions of the bar 48 to which they are riveted, or otherwise rigidly secured. The supporting arms 45 and the supporting bar 48 are provided with hooks 52, or other suitable devices, by means of which articles may be suspended therefrom. It will be apparent that in disassembling the display device the longitudinal supporting member 48 can be lifted out and disconnected from the supplemental standards so that it can be packed flat on its side and that the supplemental standards may be then removed from the main standards and laid flat upon their sides, thus enabling the same to be packed snugly in the bundle, or crate, with the other parts of the structure.

It will be apparent from the foregoing description that I have provided a display device which is very simple in its construction, and of a strong, durable character, but which can be readily disassembled, or knocked down, and packed in a relatively small space, thus greatly facilitating the shipping and storing of the same. The several units of the device are complete in themselves and are of such a character that they may be packed flat one upon the other. The means for connecting the several units are very simple and of a character that permits the device to be readily assembled and, further, are of such a character that there is no likelihood of a mistake in the location of parts in the assembling of the device, there being no rights and lefts but the parts being interchangeable throughout.

While I have shown and described one embodiment of my invention I wish it to be understood that I do not desire to be limited to the details thereof as various modifications may occur to a person skilled in the art.

Having now fully described my invention what I claim as new and desire to secure by Letters Patent, is:

1. In a display device, a plurality of relatively flat structures each constituting a separate unit and each comprising an upright member, a transverse base, and a supporting member arranged above and substantially parallel with said base, a connecting device interposed between and detachably secured to the upright members only of adjacent structures to rigidly support said structures in upright positions and in spaced relation one to the other, and a display rack removably mounted on the supporting member of said structures.

2. In a display device, a plurality of relatively flat structures each constituting a separate unit and each comprising an upright member, a transverse base, and a supporting member arranged above and substantially parallel with said base, a connecting device interposed between and detachably secured to the upright members only of adjacent structures to rigidly support said structures in upright positions and in spaced relation one to the other, the upright member of each structure having means whereby a connecting device may be attached to either side thereof, and a display rack removably mounted on the supporting members of said structures.

3. In a display device, a plurality of flat structures each comprising an upright member and a narrow lateral base member, and a resilient spacing frame attached to the upright members and connecting said structures, said frame adapted to be sprung into position, whereby said structures are spaced and said device is supported longitudinally by said frame and said device is supported laterally by said base members.

4. In a display device, a pluraliy of relatively flat structures, each comprising a narrow base, a standard extending upwardly from said base and having a slot, a stud arranged within said slot, and supporting members carried by said standard and arranged parallel with said base, a connecting member interposed between two of said structures and having hook shaped ends to engage the studs carried by said standards and rigidly connect said structures one to the other, and display racks removably mounted on said supporting members.

5. In a display device, a plurality of relatively flat structures, each comprising a narrow base, a standard carried by said base and comprising a plurality of angle irons having their angles adjacent to the center of said standard and rigidly connected one to the other in spaced relation to form a slot extending through said standard parallel with said base, said angle irons being rigidly secured to said base at their lower ends, a supporting member mounted in the slot in said standard and rigidly secured to said standard, means for connecting said structures one to the other, and display racks carried by said supporting members.

6. In a display device, a plurality of relatively flat structures, each comprising a narrow base, a standard carried by said base and comprising a plurality of angle irons having their angles adjacent to the center of said standard and rigidly connected one to the other in spaced relation to form a slot extending through said standard parallel with said base, said angle irons being rigidly secured to said base at their lower ends, a supporting member mounted in the slot in said standard and rigidly secured to said standard, said supporting member having its outer end portion slotted and having a stud extending transversely to said slot, a connecting device arranged between two of said structures to rigidly connect the same one to the other, and a display rack carried by the supporting members of said structures and having lugs to engage the studs arranged in the slots of the respective supporting members.

7. In a display device, a plurality of relatively flat structures, each comprising a base consisting of two angle irons having flanges arranged face to face and rigidly connected one to the other but spaced apart to form a horizontal slot between the same, a standard comprising a plurality of angle irons connected at their lower ends to said base, having their angles arranged adjacent to the center of said standard, and rigidly connected one to the other in spaced relation to form a vertical slot between the same, a supporting member comprising two bars arranged face to face, extending through said vertical slot and rigidly secured to said standard, said bars having their outer portions spaced apart and rigidly connected one to the other, a stud mounted between said supporting members at the ends thereof, a brace extending through the vertical slot in said standard and rigidly secured to said standard and having its ends bent downwardly and rigidly secured to said base in the horizontal slot thereof, a second brace extending through the vertical slot in said standard, rigidly secured thereto and having its ends bent upwardly and rigidly secured to the respective end portions of said supporting member between the two bars thereof, means for connecting two of said structures in spaced relation, and display racks mounted on the supporting members of the two structures and lugs depending from said display racks and arranged to enter the spaces between the bars of the respective supporting members and to engage the respective studs carried by said bars.

8. In a display device, a plurality of relatively flat structures, each comprising a narrow base, a standard extending upwardly from said base and consisting of a plurality of bars rigidly connected one to the other but spaced apart to form a slot extending lengthwise of said display device, studs extending across said slot near the respective edges of said standard, a supporting member mounted on said standard and arranged parallel with said base, a connecting member interposed between two of said structures and having hook-shaped end portions to enter the slots in the respective standards and engage the studs near the respective edges of said standards, a display rack mounted on the supporting members of the two structures, and means for holding said display racks against displacement on said supporting members.

9. In a display device, a plurality of relatively flat structures, each comprising a base, a standard extending upwardly from said base and comprising four angle irons having their corners arranged adjacent to the center of said standard, said angle irons being spaced one from the other to form slots in said standard which extend respectively transversely and longitudinally to said display device, supporting members extending through the transverse slot and rigidly secured to the respective angle irons, spacing rivets interposed between said angle irons to connect together those flanges thereof which form the longitudinal slot and to hold the same in spaced relation, a connecting member interposed between two of said structures and having hook-shaped end portions to engage the spacing rivets in the respective standards, and a display rack mounted on the supporting members of the two structures, said display rack and said supporting members having interlocking parts to hold the same against relative displacement.

10. In a display device, a relatively flat supporting structure comprising a base and a standard extending upwardly therefrom, detachable means for connecting two such structures one to the other in spaced relation, a display rack comprising bars extending lengthwise of said display device, transverse bars connecting said longitudinal bars one to the other, one of said longitudinal bars being arranged to rest upon the end portions of the bases of said structures, and said bar and said bases having interlocking parts to hold said display rack against displacement.

11. In a display device, a relatively flat supporting structure comprising a base and a standard extending upwardly therefrom, detachable means for connecting two such structures one to the other in spaced relation, a display rack comprising bars extending lengthwise of said display device, transverse bars connecting said longitudinal bars one to the other, one of said longitudinal bars being arranged to rest upon the end portions of the bases of said structures, said bar and said bases having interlocking parts to hold said display rack against displacement, and a longitudinal bar connected with said transverse bars beyond the ends of said bases and projecting above said transverse bars to form a stop.

12. In a display device, a plurality of relatively narrow structures, each comprising a narrow base, a standard extending upwardly from said base, detachable means for connecting two such structures one to the other in spaced relation, a display rack comprising an angle bar extending lengthwise of said display device and adapted to rest on the end portions of the bases of said structures, transverse members rigidly secured to said angle bar, spaced apart and extending upwardly and inwardly from said angle bar, a longitudinal bar secured to the inner ends of said transverse bars, an angle bar secured to the outer ends of said transverse bars and having one flange extending above the same, the base of each of said structures having near its end a stud, and a recessed lug carried by the first mentioned angle bar adjacent to each base and adapted to engage the respective studs.

13. In a display device, a plurality of relatively flat structures, each comprising a base and a standard extending upwardly therefrom, said structures being arranged in spaced relation relatively one to the other, studs secured to the respective standards near the adjacent edges thereof, and a connecting member comprising arch shaped bars having their intermediate portions arranged edge to edge and rigidly connected one to the other and having their ends hook shaped to engage the studs of the respective standards.

14. In a display device, a plurality of relatively flat structures, each comprising a base and a standard extending upwardly therefrom, and supporting members extending laterally from said standard parallel with said base, means for detachably connecting said structures one to the other in spaced relation, a bin mounted on the supporting members of said structures and comprising front and rear walls, said rear walls being of greater height than said front wall, and means carried by said bin for detachably connecting the same with said supporting members.

15. In a display device, a plurality of relatively flat structures, each comprising a base and a standard extending upwardly therefrom and supporting members extending laterally from said standard parallel with said base, means for detachably connecting said structures one to the other in spaced relation, a bin mounted on the supporting members of said structures, the inner portion of said bin having vertical recesses to receive the adjacent portions of the respective standards, and means carried by said bin for detachably connecting the same with said supporting members.

16. In a display device, a plurality of relatively flat structures, each comprising a base, a standard carried by said base, supporting members extending laterally from said standard substantially parallel with said base, a connecting member detachably secured to said structures to support the same in spaced relation one to the other, a supplemental standard removably mounted on the upper end of each of the first mentioned standards, supporting arms extending laterally from and rigidly secured to said supplemental standards, and a connecting bar extending between said supplemental standards, removably mounted on the upper ends thereof and extending beyond the same to form supporting arms.

17. In a display device, a plurality of relatively flat structures, each comprising a base, a standard carried by said base, supporting members extending laterally from said standard substantially parallel with said base, a connecting member detachably secured to said structures to support the same in spaced relation one to the other, a supplemental standard removably mounted on the upper end of each of the first mentioned standards and each having a slot in its upper end extending lengthwise of said display device, supporting arms rigidly secured to and extending laterally from the upper ends of said supplemental standards, and a connecting member extending between said supplemental standards and adapted to enter the respective slots therein, said connecting member having parts to hold the same against longitudinal movement relatively to said standards and having its end portions extending beyond said standards to form supporting arms.

18. In a display device, a plurality of relatively flat structures, each comprising a narrow base, a standard extending upwardly therefrom and consisting of four angle irons having their angles arranged adjacent to the center of said standard and rigidly connected one to the other in spaced relation to form slots extending both transversely and lengthwise to said display device, supporting members carried by said standard and arranged parallel with said base, a connecting device detachably secured to said standards to rigidly connect the same in spaced relation one to the other, display racks carried by said supporting members, supplemental standards each comprising four angle irons rigidly secured one to the other with their flanges in contact one with the other and adapted to enter the slots in the upper ends of the respective first mentioned standards, said angle irons being spaced apart at their upper ends to form a slot extending lengthwise of said display device, a connecting member extending between said supplemental standards, adapted to fit within said slots and having means to hold the same against longitudinal movement relatively to said standards, the ends of said connecting member extending beyond said stardards to form supporting arms, and other supporting arms rigidly secured to the upper ends of said standards and extending laterally therefrom.

19. In a display device, a standard formed of angle bars spaced apart to form a vertical slot between them and having their angles adjacent to the center of said standard, a base member secured to the lower ends of said angle bars, and a supporting member and a brace mounted in said slot.

20. In a display device, a standard formed of angle bars spaced apart to form vertical slots at right angles to each other, said bars having their angles adjacent to the center of said standard, a base member secured to the lower ends of said angle bars, a supporting member and a base member mounted in one of said vertical slots, and a connecting device having a part mounted in the other end of said slots and attached to said standard.

21. In a display device, a plurality of standards, each formed of angle bars spaced apart to form vertical slots at right angles to each other, said bars having their angles adjacent to the center of said standard, base members secured to the lower ends of said angle bars, a supporting member and a brace member mounted in one of said vertical slots, studs mounted in the other of said slots, and a frame having yieldable end portions provided with oppositely disposed recesses adapted to receive said studs and thereby connect two such standards.

22. In a display device, a standard formed of four angle bars arranged with their angles adjacent to the center of the standard and each spaced from the other to form slots between them, and a base secured to the lower ends of said angle bars.

23. In a display device, a main standard having among its parts angle bars spaced apart with their angles adjacent to the center of said standard, a supplemental standard formed of angle bars adapted to fit in the space at the upper end of the main standard, and supporting members mounted on said supplemental standard.

24. In a display device, a main standard having among its parts angle bars spaced apart with their angles adjacent to the center of said standard, a supplemental standard formed of angle bars adapted to fit in the space at the upper end of the main standard, said bars of the supplemental standard being spaced apart at one end, thereby forming a recess at the upper end of said supplemental standard, and a supporting member adapted to rest in said recess.

25. In a display device, main standards formed of angle bars spaced apart to form vertical slots and with their angles mounted adjacent to the center of said standard, base members mounted at the lower ends of said main standards, supplemental standards formed of angle bars the lower ends of which are adapted to fit in the slots in the upper ends of the main standards, and the upper ends of which are spaced apart to form recesses, lugs mounted in the spaces of the main standard, a frame connecting the lugs of two of such standards, and a brace member adapted to rest in the recesses of two of such supplemental standards.

In testimony whereof, I affix my signature hereto.

BENEDICT E. WILLETT.